United States Patent Office 3,704,326
Patented Nov. 28, 1972

3,704,326
HYDROCARBON-BRIDGED THIOMETHYLENE-
PHENOL ANTIOXIDANTS
John Song, Bound Brook, N.J., assignor to American
Cyanamid Company, Stamford, Conn.
No Drawing. Filed Jan. 22, 1970, Ser. No. 5,130
Int. Cl. C07c 149/36
U.S. Cl. 260—609 F         12 Claims

ABSTRACT OF THE DISCLOSURE

Hydrocarbon-bridged thiomethylenephenols are provided having the formula

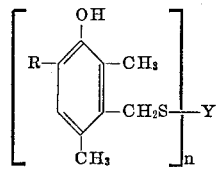

in which R is a branched-chain alkyl of 3 to 12 carbon atoms, Y is a divalent or trivalent alkylene of 2 to about 20 carbon atoms or a mononuclear aromatic radical of the formula

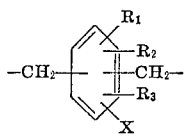

wherein $R_1$, $R_2$, and $R_3$ are hydrogen or alkyl of 1–3 carbon atoms and X is $R_1$ or —$CH_2$—, and $n$ is 2 or 3. They are antioxidants for oxygen-sensitive organic materials, particularly polyolefins of 2–6 carbon atoms such as polypropylene plastics. They are prepared by condensing two or three moles of a 3-chloromethyl-2,4-dimethyl-6-branched chain alkylphenol with a hydrocarbon dithiol or trithiol or by condensing the corresponding 3-mercaptomethyl phenol with a hydrocarbon having two or three active chloromethyl groups.

---

This invention relates to thiomethylenephenol compounds wherein two or more hindered phenol radicals having thiomethyl substituents meta to their hydroxy groups are joined through their sulfur atoms to a hydrocarbon bridge. I have found that compounds of this class which have the chemical structures hereinafter defined can be prepared from readily available starting materials and are good antioxidants for organic materials subject to oxidative deterioration when added thereto in antioxidizing amounts. My invention therefore includes the new compounds themselves, their methods of preparation, compositions of matter in which they are incorporated as antioxidants, and antioxidant processes in which they are used.

The new hydrocarbon-bridged thiomethylenephenols of my invention are defined accurately by the formula I
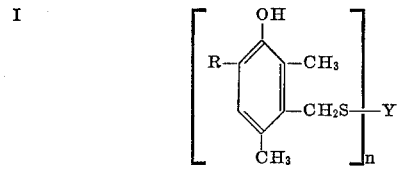

in which R is a branched-chain alkyl of from 3 to 12 carbon atoms, Y is a divalent or trivalent hydrocarbon radical of from 2 to about 18–20 carbon atoms and $n$ is 2 or 3. In all of these compounds the thiomethylene radical is meta to the hydroxyl group and is therefore not in conjugation therewith; this imparts good antioxidant and nonstaining properties to the compounds. In addition the phenolic hydroxyl is fully hindered by a methyl radical adjacent the thiomethylene substituent and by a larger secondary or tertiary alkyl of at least three and preferably four or more carbon atoms on its opposite side. This ensures the formation of antioxidants that are nondiscoloring, a very important property in an antioxidant for polyolefins and other light-colored synthetic and natural plastics. Representative branched-chain alkyls that may be present at the 6-position of the phenol radical are isopropyl, isobutyl, tertiary butyl, dimethylpropyl, 2,2-diethylhexyl, and di- and tri-propylene and butylene radicals. Tertiary butyl is the preferred substituent.

The preferred compounds of my invention are those according to Formula I in which $n$ is 2 and Y is a straight-chain or branched-chain alkylene of 2 to about 12 carbon atoms or a mononuclear aromatic radical of the formula (II)
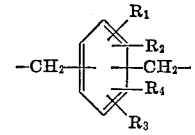

in which $R_1$, $R_2$, $R_3$ and $R_4$ are hydrogen or lower alkyl radicals, preferably of from 1 to about 3 carbon atoms. Representative compounds of these classes will be shown in the examples.

The compounds of the invention may be prepared according to one of several methods, depending largely on the availability of the intermediates. In general they are made by the reaction of an active halomethyl group such as a chloromethyl or bromomethyl group with a thiol group, the reaction being carried out in the presence of an acid acceptor.

Thus the new compounds of my invention may be prepared from the corresponding alkylphenols having a chloromethyl substituent meta to the hydroxyl group. This may be introduced into the 3-position of a 2,4-dimethyl-6-alkylphenol or phenol acetate by reaction with hydrochloric acid and formaldehyde or methylal in the presence of hydrochloric acid and $H_2SO_4$ by the procedure of R. Wegler and E. Regel, reported in Makromol. Chem. 9, 1 (1952). The 3-chloromethyl-2,4-dimethyl-6-secondary or tertiary alkylphenol, prepared by this procedure, may be reacted with a hydrocarbon of 2–20 carbon atoms containing two mercaptomethylene groups such as an alkyl dithiol of 2–12 carbon atoms, a xylene dimercaptan such as α-α'-dimercapto-p-xylene, 1,4-dimercaptomethyldurene and the like or three mercaptomethylene groups as in mesitylene trimercaptan by a condensation reaction of which the following is illustrative:

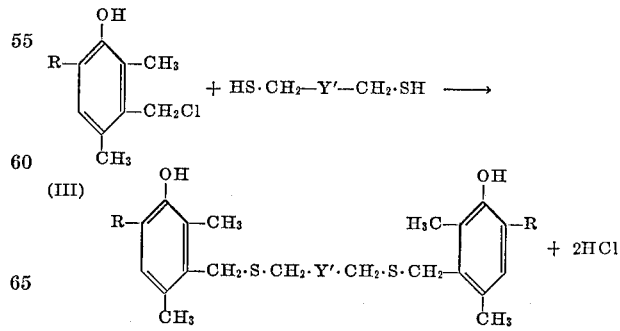

in which R is a branched-chain alkyl of 3–12 carbon atoms and Y' is a hydrocarbon radical of 2 to about 20 carbon atoms.

If desired, however, the 3-chloromethylphenol may be converted into the corresponding 3-mercaptomethyl-2,4- dimethyl-6-sec. or tert. alkylphenol. This can be done by dissolving the chloromethyl compound in tetrahydrofuran, adding at least a molecular equivalent of triethylamine, trimethylamine, or other acid acceptor and bubbling in hydrogen sulfide until the mercaptan formation is complete. Compounds of the present invention can be prepared by reacting two or three molar equivalents of the 3-mercaptomethyl compounds so produced with one mole of an aliphatic or alkaryl compound containing two or three active halomethyl groups by the procedures illustrated in some of the following examples.

Representative compounds containing active halomethyl groups that can be used in this manner are the alpha, omega-dichloroalkanes and dibromoalkanes of 2–12 carbon atoms and the trichloro and tribromoalkanes of the formula

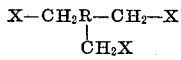

where $x$ is chlorine or bromine and R is an aliphatic radical of 1 to 9 carbon atoms. The corresponding chloro- or bromo-substituted polymethylbenzols such as alpha-alpha-dichloro-p-xylene, 1,4 - dichloromethyldurene and 2,4,6-tribromomethylmesitylene are used when the thiomethylenephenol antioxidants containing a mononuclear aromatic hydrocarbon bridge are desired.

The reactions between these reagents are carried out in the presence of acid acceptors such as an alkali metal carbonate or alkoxide and preferably in a solvent or solvent mixture such as tertiary butanol, dimethylformamide or methyl isobutylketone. Reaction temperatures are not critical and may vary from room temperature to the boiling point of the mixture when reflux conditions are used. The desired reaction products may be purified by recrystallization and may be further purified by chromatography on aluminum oxide if desired.

The compounds of this invention are especially useful as antioxidants for polyolefins (e.g., homopolymers or copolymers of mono α-olefins of 2–6 carbons) in which they exhibit a high degree of activity and are non-discoloring. The compounds can be similarly used in other organic material normally subject to oxidative deterioration, including ABS resins (acrylonitrile-butadiene-styrene copolymers), the polyamides, polyacetals (e.g., polyformaldehyde), polystyrene, impact polystyrene, natural rubber and the various synthetic rubbers including ethylene-propylene copolymer rubbers, and in oils, fats, greases, gasoline and the like.

The compounds are incorporated into the various substrates according to any of the well known techniques, including milling, Banbury mixing, swelling, etc. In polypropylene the compounds are effectively incorporated by milling on a conventional two roll plastic mill. The compounds are effective as antioxidants over a range of concentration of from about 0.01 to about 5%. In polypropylene they are used preferably at a concentration of from 0.05 to 1%, based on the weight of the substrate. These quantities are sometimes hereinafter described as antioxidizing amounts of the antioxidant compound or compound mixture.

In the case of polymers, after milling, during which other ingredients such as filler, plasticizers and light absorbers may be added, the polymer composition is compression molded, cast, spun, injection molded or extruded to a shaped article.

The antioxidant activity of the compounds of this invention in polypropylene is greatly enhanced by concurrent used with esters of thiodipropionic acid, well known secondary stabilizers for polypropylene.

Oxidative deterioration of polypropylene and other similar oxidizable plastic materials is evident from the embrittlement which occurs on exposure to atmospheric oxygen. The extent to which the antioxidant protects against deterioration is measured by determining the hours to embrittlement at 140° C.–150° C. when a specimen 15–20 mils in thickness, containing the antioxidant, is exposed in a forced draft oven at this temperature.

The invention will be further described and illustrated by the following specific examples to which, however, it is not limited except as is indicated by the appended claims.

EXAMPLE 1

3,3'[ethylenebis(thiomethylene)]-bis-(6-t-butyl-2,4-dimethylphenol)

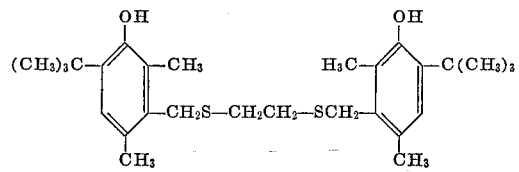

A mixture of 33.97 g. (0.15 mole) of 4-tert-butyl-3-hydroxy-2,6-dimethylbenzylchloride, 7.05 g. (.075 mole) of 1,2-ethane dithiol and 60.72 g. (0.60 mole) of triethylamine in 225 ml. of tetrahydrofuran was heated at 60–62° for a period of 19 hours. The triethylamine hydrochloride was collected. The filtrate was concentrated to 150 ml. and diluted with 250 ml. of benzene. The benzene solution was washed with dilute hydrochloric acid, water and dried over anhydrous sodium sulfate. The salt was removed and the filtrate concentrated to give a mass (11.85 g.) of tan crystals, M.P. 125–128°.

A recrystallization from benzene-hexane (1:1) mixture gave 8.6 g. of cream colored crystals, M.P. 131–133°. An analytical specimen was obtained after chromatography of this material on aluminum oxide using benzene-chloroform (1:2) mixture as eluant. The colorless crystals melted at 143–144°.

Calc. (percent): C, 70.89; H, 8.86; S, 13.50. Found (percent): C, 71.09; H, 9.02; S, 13.21.

EXAMPLE 2

3,3'-[tetramethylenebis (thiomethylene)]-bis(6-t-butyl-2,4-dimethylphenol)

The procedure of Example 1 was repeated, but 9.15 g. of 1,4-butane dithiol were substituted for the ethane dithiol of that example. The purified product melted at 110°–111° C.

EXAMPLE 3

3,3'-[hexamethylenebis(thiomethylene)]bis(6-t-butyl-2,4-dimethyl phenol)

The procedure of Example 1 was again repeated using .075 mole (15 g.) of 1,6-hexane dithiol. The purified product melted at 134–135° C.

EXAMPLE 4

3,3'-[ethylethylenebis(thiomethylene)]bis(6-t-butyl-2,4-dimethyl phenol)

An equivalent quantity (.075 mole) of ethyl-1,2-ethane dithiol

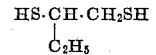

was substituted for the ethane dithiol in the process of Example 1. The purified product was a pole yellow oil.

EXAMPLE 5

3,3'-[p-phenylenebis(methylenethiomethylene)]bis-(6-t-butyl-2,4-dimethyl phenol)

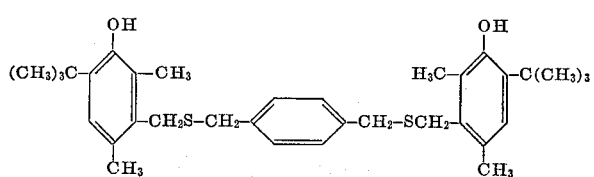

(a) To a 200 ml. 3-neck flask containing 40 ml. of tert-butanol was added 9.25 g. (.08 mole) of potassium tert-butoxide and 18.5 g. (.08 mole) of 6-tert-butyl-3-mercaptomethyl-2,4-dimethylphenol. To this stirred mixture was added 6.75 g. (.0375 mole) of α,α'-dichloro-p-xylene and 40 ml. of dimethylformamide. The reaction was heated at 100–104° for 3½ hours and concentrated in-vacuo. The residue was added to 200 ml. of ice water to form 20.95 g. of a tacky yellow precipitate. Recrystallization from benzene-methylcyclohexane (1:1) mixture gave fine tan crystals, M.P. 183–185°. Two additional recrystallizations from chloroform-methanol (1:2) mixture gave an analytical specimen, M.P. 195–196°.

Calc. (percent): S, 11.64. Found (percent): S, 11.06.

(b) In a similar manner, by substituting 1,4-dichloromethyldurene for the α,α'-dichloro-p-xylene, the following compound is prepared.

3,3'-[tetramethyl-p-phenylenebis(methylene)]bis(6-t-butyl-2,4-dimethyl phenol)

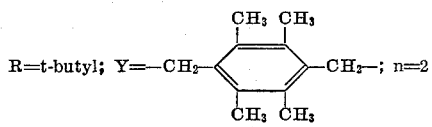

R=t-butyl; Y=—CH₂— ... —CH₂—; n=2

EXAMPLE 6

2,4,6-tris{[(4-t-butyl-3-hydroxy-2,6-dimethylbenzyl)thio]methyl}mesitylene

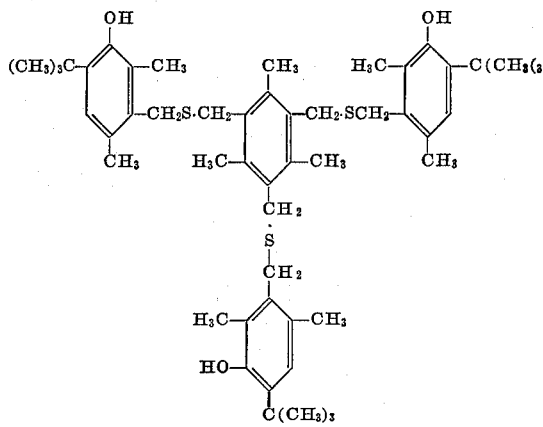

To a 500 ml. 3-neck flask, equipped with a Dean-Stark Trap, containing 200 ml. of methyl isobutyl ketone was added 11 g. (.04 mole) of 3-acetoxy-4-tert-butyl-2,6-dimethylbenzylmercaptan, 3 g. (.0075 mole) of 2,4,6-tribromomethylmesitylene, 5.52 g. (.04 mole) of anhydrous potassium carbonate, and 1 g. (.006 mole) of potassium iodide. The mixture was heated at reflux for 6 hours, cooled, and the inorganic salt collected. The solvent was steam stripped to give a semi-solid residue. This was extracted with benzene, washed, and concentrated to give 10.6 g. of a viscous residue. The product, 2,4,6-tris{[(3-acetoxy-4-tert-butyl - 2,6 - dimethyl benzyl)thio]methyl} mesitylene, was isolated as an oil by chromatography on aluminum oxide using hexane-chloroform (1:1) mixture as eluant.

The oily product was hydrolyzed using aqueous alcoholic potassium hydroxide under nitrogen. A recrystallization from chloroform gave an analytical specimen, M.P. 193–196°.

EXAMPLE 7

The compounds of the preceding examples were incorporated into unstabilized polypropylene in amounts of 0.2% on the weight of the polymer by milling at 175–180° C. The polypropylene was then compression molded into films 15–20 mils in thickness. These were aged in a forced-draft oven at 140° C. and the efficiency of the compound as an antioxidant was determined by noting the time in hours to embrittlement at this temperature. The results are shown in the following table.

TABLE 1

| Additive | Hours to brittle point |
|---|---|
| None (control) | 2–4 |
| Example 1 | 230–235 |
| Example 2 | 310–320 |
| Example 3 | 490–500 |
| Example 4 | 370–380 |
| Example 5(a) | 550–560 |
| Example 6 | 240–250 |

These results indicate that the effectiveness of the compounds of the present invention as antioxidants increases when the molecular weight of the bridging hydrocarbon becomes a larger proportion of the total molecular weight of the compound. This is quite surprising, since the phenolic portions of the molecule are usually considered to be responsible for the antioxidant action.

What I claim is:

1. A hydrocarbon-bridged thiomethylenephenol of the formula

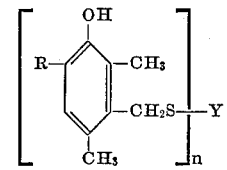

in which R is a branched-chain alkyl of 3 to 12 carbon atoms, Y is a divalent or trivalent alkylene of from 2 to about 20 carbon atoms or a mononuclear aromatic radical of the formula

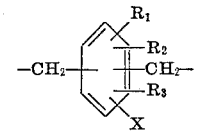

wherein $R_1$, $R_2$, and $R_3$ are hydrogen or alkyl of 1–3 carbon atoms and X is $R_1$ or —CH₂—, and $n$ is 2 or 3.

2. A thiomethylenephenol according to claim 1 having the formula

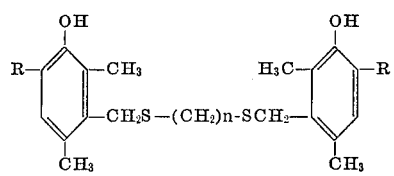

in which R is a branched-chain alkyl of from 3 to 12 carbon atoms and $n$ is a whole number from 2 to 12.

3. A thiomethylenephenol according to claim 2 in which $n$ is 2.

4. A thiomethylenephenol according to claim 2 in which $n$ is 4.

5. A thiomethylenephenol according to claim 2 in which $n$ is 6.

6. A thiomethylenephenol according to claim 1 having the formula

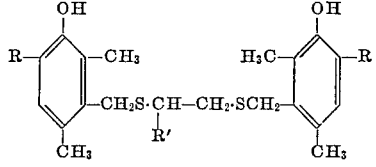

in which R is a branched-chain alkyl of from 3 to 12 carbon atoms and R' is lower alkyl.

7. A thiomethylenephenol according to claim 6 in which R' is ethyl.

8. A thiomethylenephenol according to claim 1 having the formula

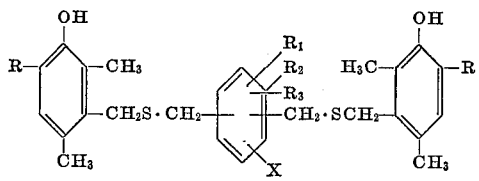

in which R is a branched-chain alkyl of 3 to 12 carbon atoms, $R_1$, $R_2$, and $R_3$ are hydrogen or alkyl of 1–3 carbon atoms, and X is $R_1$ or

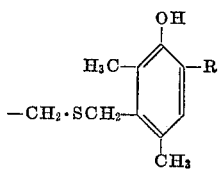

9. A thiomethylenephenol according to claim 8 having the formula

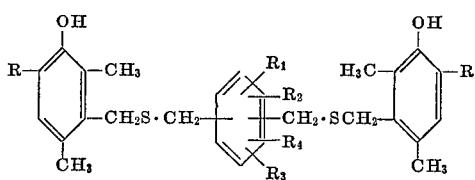

in which R is a branched-chain alkyl of 3 to 12 carbon atoms and $R_1$, $R_2$, $R_3$ and $R_4$ are hydrogen or alkyl of 1–3 carbon atoms.

10. A thiomethylenephenol according to claim 8 having the formula

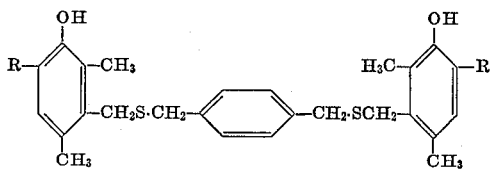

in which R is a branched-chain alkyl of 3 to 12 carbon atoms.

11. A thiomethylenephenol according to claim 8 having the formula

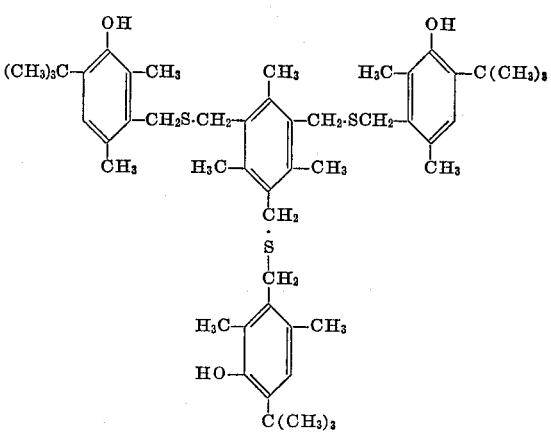

12. A compound as defined in claim 1 wherein R is t-butyl.

References Cited
UNITED STATES PATENTS

| | | | | |
|---|---|---|---|---|
| 3,310,587 | 3/1967 | O'Shea | | 260—609 F |
| 3,299,147 | 1/1967 | O'Shea | | 260—609 F |
| 3,509,220 | 4/1970 | Braus | | 260—609 F |
| 3,489,804 | 1/1970 | O'Shea | | 260—609 F |

LEWIS GOTTS, Primary Examiner

D. R. PHILLIPS, Assistant Examiner

U.S. Cl. X.R.

252—404; 260—45.95